United States Patent [19]

Schoofs

[11] Patent Number: 5,105,328
[45] Date of Patent: Apr. 14, 1992

[54] SEMICONDUCTOR CIRCUIT HAVING AN EXCESS VOLTAGE PROTECTION CIRCUIT

[75] Inventor: Franciscus A. C. M. Schoofs, Eindhoven, Netherlands

[73] Assignee: U.S. Philips Corporation, New York, N.Y.

[21] Appl. No.: 449,634

[22] Filed: Dec. 12, 1989

[30] Foreign Application Priority Data

Dec. 15, 1988 [GB] United Kingdom ............... 8829268

[51] Int. Cl.$^5$ .............................................. H02H 3/20
[52] U.S. Cl. ........................................ 361/91; 361/18;
361/111; 361/59
[58] Field of Search ................... 361/18, 91, 56, 111, 361/59

[56] References Cited

U.S. PATENT DOCUMENTS

| | | | |
|---|---|---|---|
| 3,407,339 | 10/1968 | Booher | 361/91 |
| 3,582,713 | 6/1971 | Till | 361/18 |
| 4,020,395 | 4/1977 | Erickson | 361/18 |
| 4,306,185 | 12/1981 | Leuschner | 361/18 |
| 4,513,341 | 4/1985 | Kollanyi | 361/18 |

Primary Examiner—A. D. Pellinen
Assistant Examiner—C. S. Schultz
Attorney, Agent, or Firm—Bernard Franzblau

[57] ABSTRACT

A semiconductor circuit has d.c. supply lines (10/13,11/14) and an excess voltage protection circuit. The protection circuit comprises a switching transistor (T1) connected in series with one of the supply lines (10/13) and a control circuit (15) which is responsive to a voltage detector circuit (16) coupled to the one supply line (10/13). The control circuit triggers the switching transistor to a non-conductive state upon detection of an excess voltage. The voltage detector circuit comprises a semiconductor element (T8) having a voltage breakdown characteristic correlated with one or more of the remaining semiconductor elements (T10). The semiconductor element (T8) is adapted to be driven to breakdown in response to a voltage across the supply lines less than that which will cause breakdown of the one or more remaining semiconductor elements T10. The increased current drawn by the semiconductor element (T8) at the onset of breakdown is effective to cause the control circuit to trigger the switching transistor to its non-conductive state.

22 Claims, 3 Drawing Sheets

SEMICONDUCTOR CIRCUIT HAVING AN EXCESS VOLTAGE PROTECTION CIRCUIT

BACKGROUND OF THE INVENTION

This invention relates to a semiconductor circuit having an excess voltage protection circuit and more particularly to such a circuit suitable for semiconductor integration in circuits operated from rectified a.c. mains voltages.

The present invention results from a consideration of the requirements for powering miniature fluorescent lamps intended to form substitutes for conventional incandescent lamps, but is applicable to other applications. Examples of such fluorescent lamps are the so called SL and PL types. Such lamps are required to be operated directly from a mains (AC) power source via, for example, an input filter, a clamping circuit and a rectifier.

Problems arise in such circuits in that in addition to the 230 volts RMS, the mains also carries voltage fluctuations of up to 60% together with transients of kilovolt and kiloamp magnitude. With a view to miniaturisation and cost saving it is desirable to produce the drive circuits for a fluorescent lamp by an integrated circuit process and such a circuit must accordingly be capable of withstanding voltages higher than 230 V.RMS.

The voltage supply from the mains can be limited to 750 V peak in a relatively cheap manner by means of a resistor (10 ohms) in series with the mains followed by a voltage dependent resistor clamp across the input to the subsequent circuit. Although transistors capable of operating at 750 V are producible it is difficult to provide them in integrated form. One way of providing a degree of protection is to compare the voltage with a reference voltage and depending on the comparison to take appropriate steps, for example, disable the supply voltage until the over voltage has disappeared. To provide adequate protection in mass production of such circuits it is necessary to take the worst case component tolerances into account so that the circuit is designed to operate for components at the bottom end of the distribution curve for a specific performance, e.g. breakdown voltage, switch off characteristics and reference voltage. Accordingly, the supply is disabled more frequently than might be desirable because protection is provided against lower over voltages than are necessary in many cases. This is a particular problem for systems where large voltage fluctuations can occur, in which case it is desirable to sustain the operation as long as possible. This is particularly problematical in fluorescent lighting systems fed from the rectified mains source as disablement of the supply even for the duration of a half cycle of the a.c. supply can cause the lamp to flicker. Accordingly, the present invention seeks to provide a semiconductor circuit including a protection circuit which limits the maximum voltage and which avoids unnecessary switch off of the supply.

SUMMARY OF THE INVENTION

According to the invention there is provided a semiconductor circuit having d.c. supply lines and an excess voltage protection circuit, characterised in that the protection circuit comprises a switching transistor connected in series with one of the supply lines, a control circuit which is responsive to a voltage detector circuit coupled to the supply line and which is effective to trigger the switching transistor to a non-conductive state upon detection of an excess voltage, wherein the voltage detector circuit comprises a semiconductor element, having a voltage breakdown characteristic correlated with one or more of the remainder of the semiconductor elements, adapted to be driven to breakdown in response to a voltage across the supply lines less than that which will cause breakdown of said one or more of the remainder of the semiconductor elements and in which the increased current drawn at the onset of breakdown of the semiconductor element is effective to cause the control circuit to trigger the switching transistor to its non-conductive state.

By employing such a semiconductor element the semiconductor circuit can be protected against breakdown by sensing the potential breakdown of the element which will always occur prior to said one or more other semiconductor elements in the circuit.

In one form of the invention the semiconductor element has the same breakdown characteristic as said one or more of the remainder of the semiconductor elements, but is arranged to be exposed to a voltage component in addition to that which occurs across the supply lines such that it is exposed to a voltage greater than that of said one or more of the remainder of the semiconductor elements.

Preferably, the semiconductor element and said one or more of the remainder of the semiconductor elements are fabricated on a single integrated circuit chip.

The voltage breakdown characteristic may be effected during manufacture of the integrated circuit chip by the introduction of a different doping concentration in the semiconductor element than in said one or more of the remainder of the semiconductor elements, by employing in the semiconductor element a dopant different from that in said one or more of the remainder of the semiconductor elements, or by adapting the layout such that different overlap of the masks occur for said semiconductor element relative to said one or more of the remainder of the semiconductor elements. Ideally, all of the circuitry is fabricated on the same integrated circuit chip.

In one advantageous construction the switching transistor is of the field effect type having a gate coupled with a source of triggering voltage. The drain to source path of the switching transistor is in series with one of the supply lines and is coupled with the other one of the supply lines via a resistor in series with the drain-source path of the semiconductor element. The control circuit comprises a degenerate thyristor connected between the gate and source of the switching transistor. The voltage detector circuit includes a transistor having its emitter-collector path connected in series with the semiconductor element and a triggering input of the thyristor. The base of this transistor is coupled with the end of the resistor remote from said semiconductor element such that when there is an overvoltage the current drawn by said semiconductor element switches the transistor and thereby triggers the thyristor into conduction and causes the switching transistor to be triggered to a non-conductive state.

In an alternative construction the switching transistor is of the field effect type having a gate connected to a source of voltage. The drain to source path of the switching transistor is in series with one of the supply lines. The control circuit comprises a degenerate thyristor connected between the gate and the source of the switching transistor. The semiconductor element is connected between a triggering input of the thyristor and the other one of the supply lines such that, when there is an overvoltage, the current drain thereby is effective to trigger the thyristor into conduction and cause the switching transistor to be triggered to a nonconductive state.

BRIEF DESCRIPTION OF THE DRAWINGS

In order that the invention and its various other preferred features may be understood more easily, several embodiments thereof will now be described, by way of example only, with reference to the accompanying drawings, in which.

DESCRIPTION OF THE PREFERRED EMBODIMENTS

Figure 1:
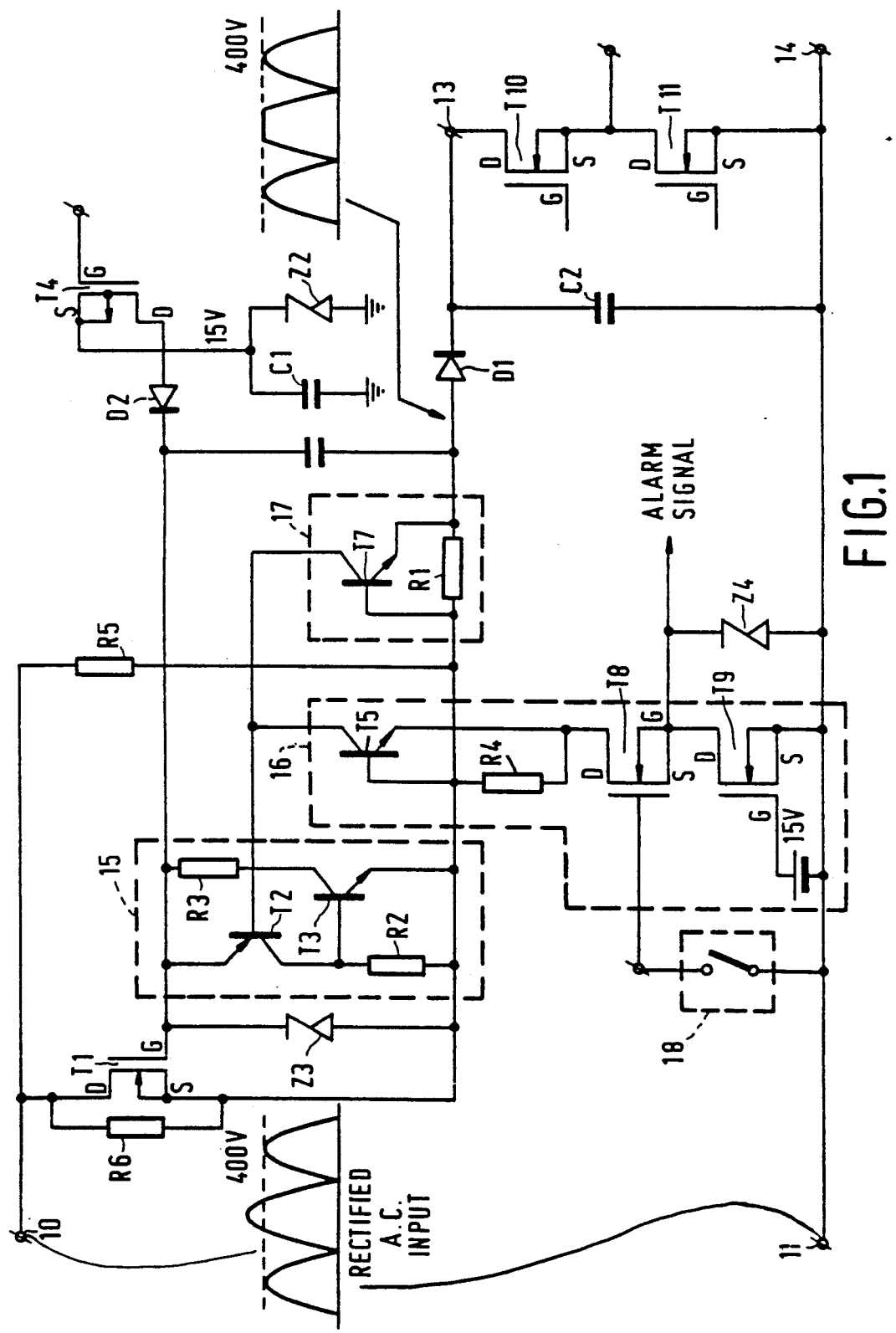
FIG. 1 is a schematic circuit diagram of one embodiment of a semiconductor circuit with a voltage protection circuit constructed in accordance with the invention.

Referring now to FIG. 1, the voltage protection circuit has a pair of input lines 10, 11 for connection to a source of rectified a.c. supply voltage. One of the input lines 10 is connected via a switching transistor T1, shown for example as a NMOS type, a resistor R1 and a diode D1 to an output terminal 13, whereas the other input terminal 11 is connected directly to an output terminal 14. The source of the transistor T1 is coupled via a resistor R4 and the series connected drain/source paths of a pair of field effect transistors T8 and T9 to the supply line 11/14. The transistor T9 is biassed at a low current level by a low gate to source voltage. (e.g. 0.5 volts above the threshold). Transistor T9 is bridged by a zener diode Z4 of which the anode is connected to the supply line 11. The gate to source path of the transistor T1 is bridged by a control circuit 15 which is formed by a degenerate thyristor circuit comprising in this example a pnp transistor T2 having its emitter coupled to the gate of T1, its collector connected via a resistor R2 to the source of T1 and its base connected to the collector of an npn transistor T3 of the thyristor. The transistor T3 also has its collector connected to the gate of T1 via a resistor R3 and its emitter connected to the source electrode of T1. The gate of transistor T1 is connected via a blocking diode D2 to the drain of a field effect transistor T4 the source of which is connected to a 15 volt supply line. The circuitry coupled with the supply line 10/13 and fed from the line 10 floats in voltage up and down with the rectified mains voltage. The transistor T4 serves to switch on the transistor T1 in response to a control signal applied to the gate of transistor T4 either from a remote source or by a manual switch. In its normal state T4 is arranged to be on and applies a 15 volt switch on voltage to the gate G of T1 while the thyristor circuit is off.

A voltage detector circuit 16 is provided which comprises the resistor R4 and an npn transistor T5, the base of which is connected to that side of resistor R4 which is connected to the source of T1. The emitter of T5 is connected to the other side of the resistor R4. The collector electrode of T5 is coupled with the collector of transistor T3 of the thyristor circuit. When the voltage on line 10/13 becomes larger than the breakdown voltage of T8, the current through R4 causes T5 to be switched on and the current through R3 triggers the thyristor which discharges the capacitance Cgs of T1, switches off the transistor T1 and prevents the output voltage from rising in response to peaks of the input voltage.

In order to switch the thyristor on and thereby turn off T1, there is provided a switching input 18 which is connected to the gate of transistor T8. In response to a control signal on the gate of T8, either provided remotely or via a mechanical switch, the transistor T8 can be switched on causing an increase of current through R4 and the consequential switching on of transistor T5 thereby triggering the thyristor to switch on and the transistor T1 to be switched off. The gate to source voltage of T1 can be restored at each zero crossing of the mains voltage by applying the proper gate voltages at the gates of T4 and T8.

An output current detector circuit 17 is also provided and comprises an npn transistor T7 in combination with the resistor R1. The base of T7 is connected to the side of R1 which is coupled to the transistor T1, the emitter of T7 is connected to the other side of R1 and the collector is connected to the trigger input of the thyristor at the collector of T3. When the current through R1 produces a voltage across it sufficient to trigger T7 into conduction, then the thyristor is caused to conduct and T1 is switched off.

The transistor T4 is provided with a 15 volt supply derived from the rectified a.c. input voltage. For this purpose a 15 volt zener diode Z2 with a parallel smoothing capacitor C2 is connected between the source of T1 and a ground reference line. The source of transistor T4 is fed directly from the zener diode Z2. In order to provide some current flow from node 10 to node 13 when T1 is switched off (e.g. during start up), a resistor R6 (e.g. 10 kOhms) may be connected between the drain and source of T1.

A zener diode Z3 of say 22 volts may be connected between the gate and source of transistor circuit T1 to protect the thyristor and subsequent circuitry against overvoltage.

The output terminals 13, 14 are connected in this example to a half bridge circuit formed of field effect transistors T10 and T11. These transistors are similar to transistor T8 and have a higher but correlated breakdown characteristic. Because of this the transistor T8 will reach the onset of breakdown earlier and thereby enables protection to be effected.

Figure 2:
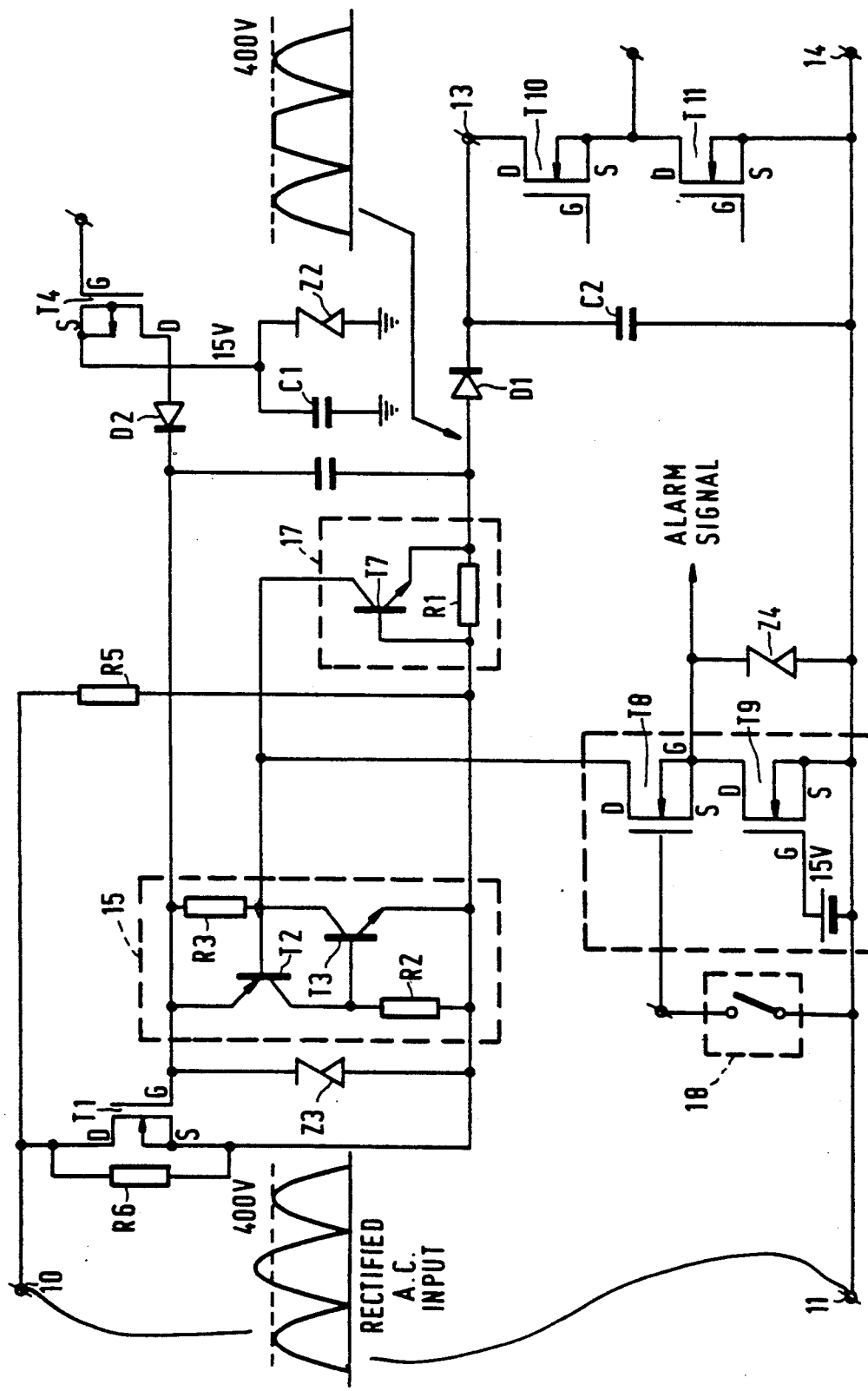
FIG. 2 is a schematic circuit diagram of a second embodiment of a semiconductor circuit with a voltage protection circuit constructed in accordance with the invention.

The circuit of FIG. 2 is very similar to that of FIG. 1 and the same reference numerals have been used for like components. FIG. 2 omits the transistor T5 and resistor R4. The drain of transistor T8 is directly connected to the collector of transistor T3. In this construction the transistor T8 in the off condition of the thyristor is exposed to a voltage greater than that on line 10/13 by approximately 15 volts. This enables the same transistor type to be used for T8 as for T10 and T11 and in this way their breakdown voltages are correlated by being substantially equal. However, in view of the increased voltage exposure of T8 this transistor will approach breakdown earlier than T10 or T11 and thereby provides advance warning of breakdown.

If T8 breaks down and the voltage at the input increases, as long as T1 is not yet switched off, an increase in voltage can be sensed at the source of T8.

Although the circuits of FIGS. 1 and 2 are shown feeding a half bridge circuit, it will be understood that other circuits can be fed and the correlated protection can be provided if the semiconductor devices employed are correlated with the protection element T8. A particularly advantageous application is a switched mode power supply feeding a miniature fluorescent lamp where the off time needs to be minimised to avoid flicker of the lamp.

The basic principle of this invention does not require T8 to be a field effect transistor as any other semiconductor device having a breakdown characteristic correlated with one or more subsequent semiconductor elements can be employed.

It will be appreciated that although the circuits of FIGS. 1 and 2 are made up of transistors of specific polarity types, a similar arrangement can be produced with transistors of opposite polarity type and such arrangements are intended to fall within the scope of this invention.

A particular advantage of the described circuitry is that it can be fabricated on an integrated circuit chip shown diagrammatically in FIG. 2 by a dashed line box 35 and which employs the resurf principle to form a lateral DMOS transistor for T1 together with transistors with a lower breakdown voltage, e.g. "vertical DMOS transistors" for the control circuit 15 and the detector circuits 16 and 17. The resurf principle and its applications are documented in proceedings of the International Devices Meeting 1979 pages 238-41, 1980 pages 87-99 and 1982 pages 81 to 83. Further information is available in our British Patents Nos. 2013029B, 2026339B, 2026240B.

Figure 3:
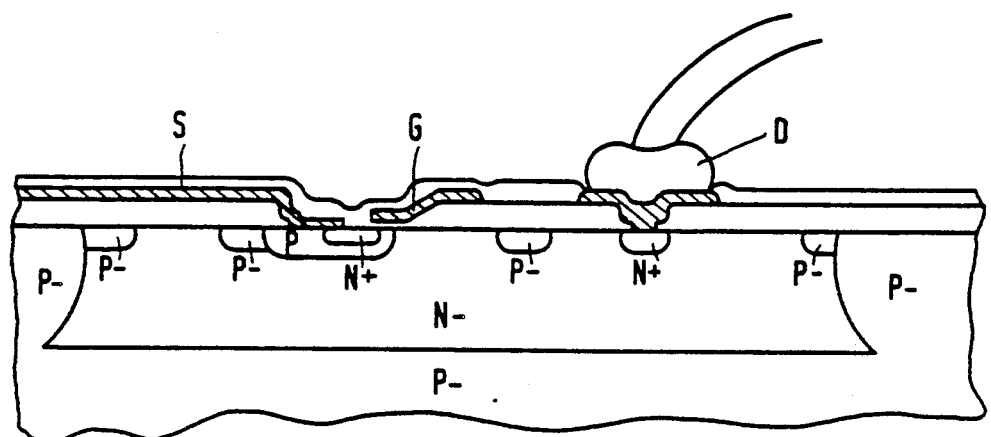
FIG. 3 is a cross sectional view of a part of an integrated circuit chip showing a double-acting resurf structure forming a switching transistor for the circuit of FIG. 1 or 2.

FIG. 3 shows a cross section of part of an integrated circuit version of the circuit of FIG. 1 or 2 showing how the transistor T1 is fabricated so as to operate with the resurf effect. This is the only transistor that is required to carry the full peak voltage fluctuations provided by the rectified a.c. input and only the drain D has an electrical connection at that voltage. It is difficult to provide on the chip conductors which will carry such voltages so the resurf principle permits the drain D to be provided with a pad to which an electrical wire is directly connected. This wire forms the input 10 shown in FIGS. 1 and 2. It is also disadvantageous to provide the extreme breakdown voltage for all the rest of the circuitry.

Figure 4:
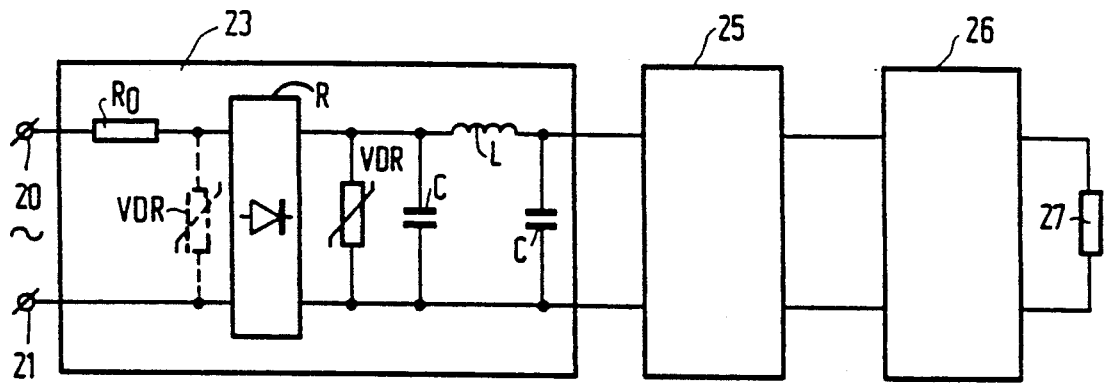
FIG. 4 is a block diagram illustrating a particular application of the semiconductor circuit with voltage a protection circuit in accordance with another aspect of the invention.
Figure 5:
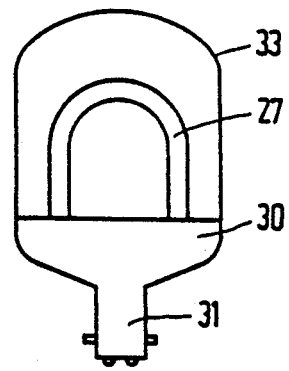
FIG. 5 is a side view of a fluorescent lamp unit which incorporates the semiconductor circuit with voltage protection circuit.

FIG. 4 shows a further aspect of the invention where the protection circuit is employed in a high voltage power supply which derives its source of power from the a.c. mains. The power supply has a pair of input terminals 20,21 for connection to the a.c. mains which are connected to a voltage clamp and rectifier circuit 23. The voltage clamp is formed by a series arrangement of resistor RO and a voltage dependant resistor VDR. VDR may be connected in parallel with the output of the rectifier circuit R, as shown in solid lines, or alternatively may be connected in parallel with the input of the rectifier circuit R as shown by dotted lines. This depends upon the relative prices of suitable protection components and the integration process. An output from the voltage clamp is coupled via a filter to a protection circuit 25 as described in connection with FIGS. 1 to 3. Alternatively, the filter circuit could be connected before the rectifier circuit. The output of the protection circuit is connected to a switched mode power supply 26, the output of which is connected to a load 27, for example, a fluorescent lamp. As already described, the protection circuit 25 can be fabricated on a semiconductor chip and this and the remainder of the circuits 23 and 26 can be built into the housing of a miniature fluorescent lamp together with the tube itself. Such an arrangement is illustrated in outline in FIG. 5 which shows a side view of a fluorescent lamp unit comprising a base 30 having a bayonet connector 31 for removeable connection of the lamp in a socket such as is employed for incandescent bulbs. The base unit contains the circuitry as described in relation to FIGS. 1 to 4 and the fluorescent tube 27 forms a load for the circuit. This tube is contained within a housing 33.

The supply circuits for a fluorescent lamp may alternatively be provided in a lamp socket or luminaire which is adapted to receive a removeable fluorescent tube.

Although the latter part of this description has been directed to the provision of a miniature fluorescent lamp unit, it will be appreciated that the invention has other applications, for example, the supply of power to:

Electronic bridge circuits suitable for providing a primary voltage for ferrite transformers in power supplies, Bridge circuits suitable for low power motors, Control electronics for discrete transistors of high power motors, Shavers, Chargers for batteries, e.g. in nickle cadmiun rechargeable devices.

I claim:

1. A semiconductor circuit comprising d.c. supply lines and an excess voltage protection circuit, wherein the protection circuit comprises; at least one load terminal for connection to a load including one or more semiconductor elements to be protected against said excess voltage, a switching transistor connected in series with one of the supply lines, and a control circuit which is responsive to a voltage detector circuit coupled to the one supply line so as to trigger the switching transistor to a non-conductive state upon detection by the voltage detector of an excess voltage, wherein the voltage detector circuit comprises; a semiconductor element having a voltage breakdown characteristic correlated with said one or more semiconductor elements and driven to breakdown in response to a voltage across the supply lines less than that which will cause breakdown of said one or more semiconductor elements, and wherein an increased current drawn at the onset of breakdown of the semiconductor element causes the control circuit to trigger the switching transistor to its non-conductive state.

2. A circuit as claimed in claim 1, wherein said semiconductor element has the same breakdown characteristic as said one or more semiconductor elements but is connected in the circuit so as to be exposed to a voltage component in addition to the voltage which occurs across the supply lines such that it is exposed to a voltage greater than that of said one or more semiconductor elements.

3. A circuit as claimed in claim 1, wherein said semiconductor element has a lower voltage breakdown characteristic than that of said one or more semiconductor elements.

4. A circuit as claimed in claim 3 wherein said semiconductor element and said one or more semiconductor elements are fabricated on a single integrated circuit chip.

5. A circuit as claimed in claim 4, wherein the lower voltage breakdown characteristic is effected during manufacture of the integrated circuit chip by introduction of a different doping concentration in said semiconductor element than in said one or more semiconductor elements.

6. A circuit as claimed in claim 4, wherein the lower voltage breakdown characteristic is effected during manufacture of the integrated circuit chip by employing in said semiconductor element a dopant different from that in said one or more semiconductor elements.

7. A circuit as claimed in claim 4, characterised in that the lower breakdown characteristic is effected during manufacture of the integrated circuit chip by providing a layout such that different overlap of the masks occur for said semiconductor element relative to said one or more semiconductor elements.

8. A circuit as claimed in claim 4 wherein all of the circuitry is fabricated on the same single 7 integrated circuit chip.

9. A circuit as claimed in claim 1 further comprising a current detector circuit responsive to current flow in one of the supply lines to trigger the switching transistor to a non-conductive state upon detection of an excess current flow in the one of the supply lines.

10. A circuit as claimed in claim 1 wherein the switching transistor is fabricated by the resurf principle and is integrated on a common semiconductor chip with the control circuit and with the detector circuit.

11. A circuit as claimed in claim 10, wherein the switching transistor has a high voltage input comprising a supply wire connected to a bonding pad on the integrated circuit structure, the switching transistor being formed by layers surrounding the pad.

12. A circuit as claimed in claim 1 wherein the switching transistor is of the field effect type having a gate coupled to a source of triggering voltage, a drain to source path connected in series with one of the supply lines and coupled to the other one of the supply lines via a resistor in series with the drain to source path of said semiconductor element, wherein the control circuit comprises a degenerate thyristor connected between the gate and the source of the switching transistor, and the voltage detector circuit includes a transistor whose emitter-collector path is connected in series with said semiconductor element and a triggering input of the thyristor, and means coupling a base of said transistor to an end of the resistor remote from said semiconductor element such that when there is an overvoltage a current is drawn by said semiconductor element that switches the transistor and triggers the thyristor into conduction which causes the switching transistor to be triggered to a non-conductive state.

13. A circuit as claimed in claim 1 wherein the switching transistor is of the field effect type having a gate coupled to a source of voltage and a drain to source path connected in series with one of the supply lines, wherein the control circuit comprises a degenerate thyristor connected between the gate and the source of the switching transistor, and wherein the semiconductor element is connected between a triggering input of the thyristor and the other one of the supply lines such that when there is an overvoltage a current drawn thereby is effective to trigger the thyristor into conduction and cause the switching transistor to be triggered to a non-conductive state.

14. A circuit as claimed in claim 12, wherein said semiconductor element is a field effect transistor.

15. A circuit as claimed in claim 9, wherein the switching transistor is of the field effect type having a gate coupled to a source of triggering voltage, a drain to source path connected in series with one of the supply lines and coupled to the other one of the supply lines via a resistor in series with the drain-source path of said semiconductor element, wherein the control circuit comprises a degenerate thyristor connected between the gate and the source of the switching transistor, and the voltage detector circuit includes a transistor whose emitter-collector path is connected in series with said semiconductor element and a triggering input of the thyristor, means coupling a base of said transistor to an end of the resistor remote from said semiconductor element such that when there is an overvoltage a current is drawn by said semiconductor element that switches the transistor and triggers the thyristor into conduction and causes the switching transistor to be triggered to a non-conductive state, and the current detector circuit comprises a second resistor connected in series with the switching transistor in the one supply line and a further transistor having its base coupled to the one supply line on the switching transistor side of the second resistor, its emitter coupled to the one supply line on the opposite side of the second resistor and its collector coupled to the triggering input of the thyristor such that an excess current through the second resistor triggers the further transistor into conduction and causes the switching transistor to be triggered to a non-conductive state.

16. A direct current power supply circuit comprising:
   a pair of input terminals for a source of alternating current,
   a voltage clamp and rectifier circuit coupled to said pair of input terminals,
   a semiconductor circuit having d.c. supply lines coupled to said voltage clamp and rectifier circuit and having an excess voltage protection circuit, said excess voltage protection circuit comprising; at least one load terminal for connection to a load including one or more semiconductor elements to be protected against said excess voltage,
   a switching transistor connected in series with one of the d.c. supply lines, and a control circuit responsive to a voltage detector circuit coupled to the one supply line so as to trigger the switching transistor into a non-conductive state upon detection of an excess voltage, wherein the voltage detector circuit comprises;
   a semiconductor element having a voltage breakdown characteristic correlated with said one or more semiconductor elements and driven to breakdown in response to a voltage across the supply lines less than that which will cause breakdown of said one or more semiconductor elements, and wherein an increased current drawn at the onset of breakdown of the semiconductor element causes the control circuit to trigger the switching transistor to its non-conductive state.

17. A discharge lamp unit comprising:

a switched mode power converter having an output coupled to a discharge tube and an input coupled to a direct current power supply circuit, and wherein said power supply circuit comprises;

a pair of input terminals for a source of alternating current, a voltage clamp and rectifier circuit coupled to said pair of input terminals, a semiconductor circuit have d.c. supply lines coupled to said voltage clamp and rectifier circuit and having an excess voltage protection circuit, said excess voltage protection circuit comprising; at least one load terminal for connection to a load including one or more semiconductor elements to be protected against said excess voltage, a switching transistor connected in series with one of the d.c. supply lines, and a control circuit responsive to a voltage detector circuit coupled to the one supply line so as to trigger the switching transistor into a non-conductive state upon detection of an excess voltage, wherein the voltage detector circuit comprises;

a semiconductor element having a voltage breakdown characteristic correlated with said one or more semiconductor elements and driven to breakdown in response to a voltage across the supply lines less than that which will cause breakdown of said one or more semiconductor elements, and wherein an increased current drawn at the onset of breakdown of the semiconductor element causes the control circuit to trigger the switching transistor to its non-conductive state.

18. A discharge lamp unit as claimed in claim 17, wherein the tube, power converter and direct current power supply circuit are incorporated in a housing equipped with a connector portion that permits removable electrical coupling with a socket for an incandescent light bulb.

19. A discharge lamp unit as claimed in claim 17, wherein the power converter and direct current power supply circuit are incorporated in a lamp socket or luminaire which is adapted to receive a removeable discharge tube.

20. A semiconductor circuit providing protection against excess voltages and comprising:

first and second input terminals for a source of supply voltage for the semiconductor circuit, at least one load terminal for connection to a load including one or more semiconductor elements to be protected against said excess voltages, a supply line including a switching transistor connected between the first input terminal and said one load terminal, a control circuit coupled to a control electrode of the switching transistor to trigger the switching transistor into cut-off upon detection of the excess voltage, a voltage detector circuit coupled to said supply line and responsive to a voltage thereat to trigger the switching transistor into cut-off via the control circuit upon detection by the voltage detector circuit of an excess voltage at said supply line, said voltage detector circuit comprising a semiconductor element having a voltage breakdown characteristic correlated with the breakdown characteristics of said one or more semiconductor elements and adapted to be driven into breakdown in response to a voltage at the supply line which is less than a voltage which will cause breakdown of said one or more semiconductor elements, and wherein an increased current drawn at the onset of breakdown of the semiconductor element causes the control circuit to trigger the switching transistor to its cut-off state.

21. A semiconductor circuit as claimed in claim 20 wherein said control circuit includes a second switching transistor coupled between the control electrode and one main electrode of the first switching transistor, and wherein said voltage detector circuit has a control input coupled to a node in the supply line between an output side of the first switching transistor and said one load terminal.

22. A semiconductor circuit as claimed in claim 21 wherein said input terminals are coupled to a source of pulsatory unidirectional supply voltage, and said semiconductor element and said one or more semiconductor elements comprise transistors.

* * * * *

UNITED STATES PATENT AND TRADEMARK OFFICE
CERTIFICATE OF CORRECTION

PATENT NO. : 5,105,328
DATED : April 14, 1992
INVENTOR(S) : Franciscus A.C.M. Schoofs It is certified that error appears in the above-indentified patent and that said Letters Patent is hereby corrected as shown below:

Column 7:

Claim 7, line 1, delete "characterised in";
        line 2, change "that" to --wherein--.

Claim 8, line 2, delete "7".

Signed and Sealed this

Eighth Day of February, 1994

Attest:

BRUCE LEHMAN

Attesting Officer     Commissioner of Patents and Trademarks